Patented June 17, 1941

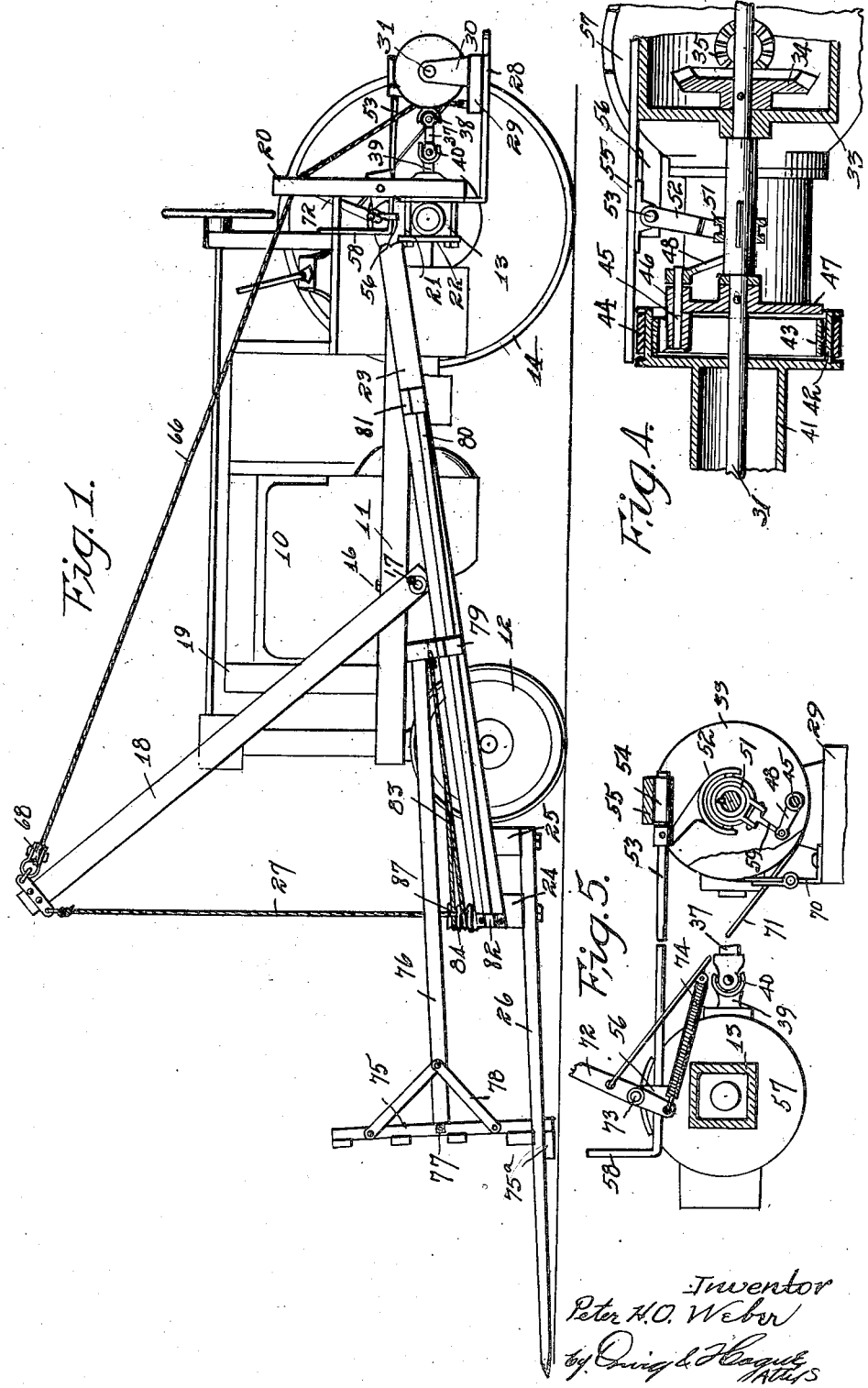

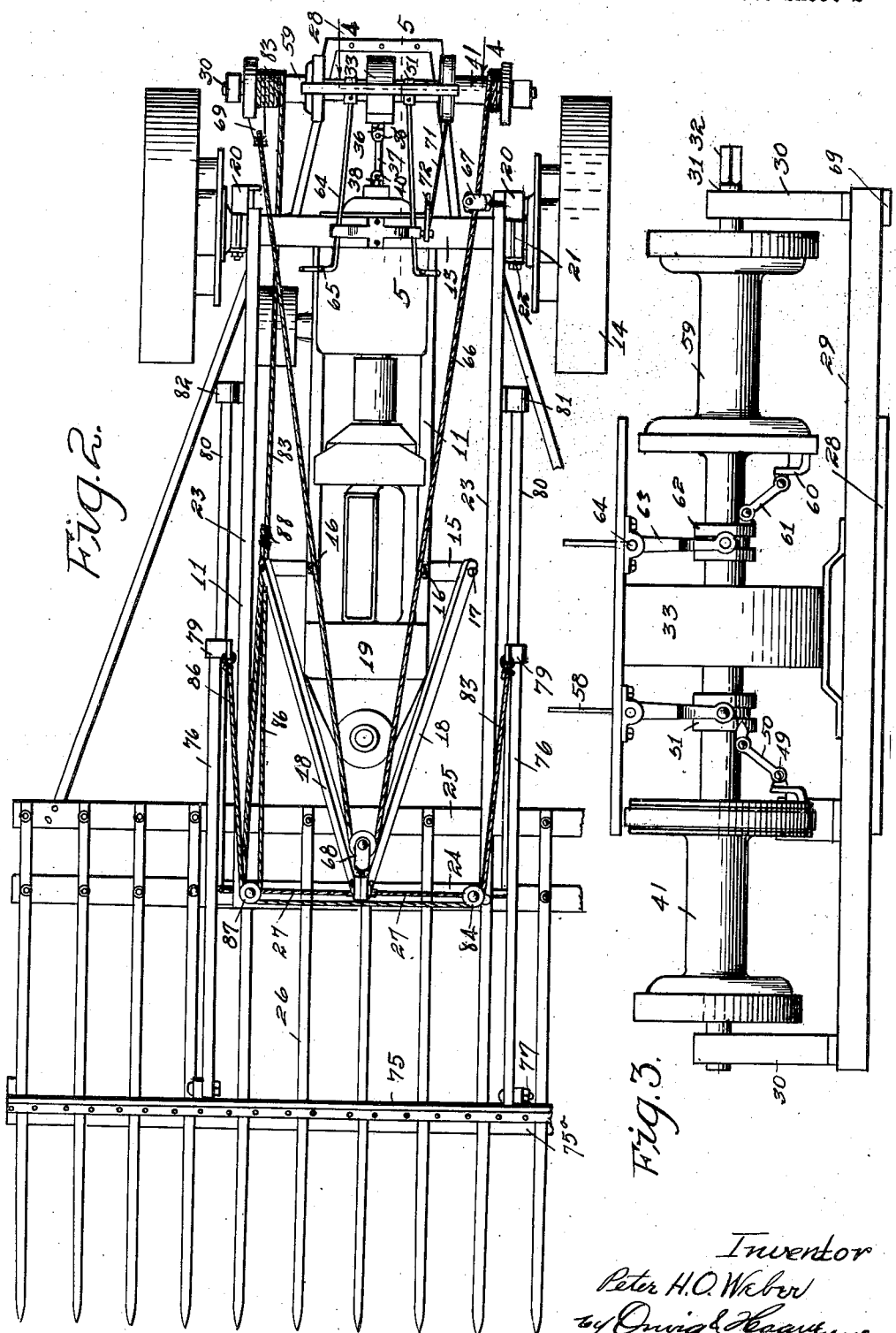

2,246,083

UNITED STATES PATENT OFFICE 2,246,083

HAY BUCK AND STACKER

Peter H. O. Weber, Dunlap, Iowa, assignor of one-half to George V. Gorham, Dunlap, Iowa Application September 18, 1939, Serial No. 295,407

8 Claims. (Cl. 214—131)

The object of my invention is to provide an improved hay stacker that may be easily and quickly attached to a farm tractor to support the stacker in a portable manner and to supply the necessary power required to operate the stacker.

A further object of my invention is to provide in a hay stacker employing a rake or buck for gathering and elevating the hay, improved means for pushing or moving the load carried by the rake toward the free end of the rake tines by power derived from the tractor power take-off device, and in connection therewith means for controlling the push-off means independently of the means for elevating and lowering the rake or stacker means.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved stacker showing the manner in which it is applied to a farm tractor, with the traction wheel on the inner side removed.

Figure 2 is a plan view of the same with one end of the buck or rake broken away.

Figure 3 is an enlarged rear end elevation of the drums for controlling the cables for elevating and lowering the stacker and also for operating the push-off device.

Figure 4 is an enlarged detail sectional view taken on the line 4—4 of Figure 2.

Figure 5 is a detail sectional view taken on the line 5—5 of Figure 2.

In the drawings I have used the reference numeral 10 to indicate generally a farm tractor having a horizontally arranged frame 11 supported at its front end with steering wheels 12 and provided at its back end with an axle 13 supported by traction wheels 14.

Fixed to the under side of the frame member 11 is a bar 15 by means of suitable bolts 16, each end of the bar 15 being provided with a pivot member 17. Supported on said pivot members is a V-shaped frame member 18 which I shall term a gin or mast, designed to be supported normally in an upwardly and forwardly inclined position, as illustrated in Figure 1, and adapted to straddle the forward end of the tractor and the radiator 19 carried thereby.

Fixed to each end of the axle 13 is an upright 20 by means of bolts 21 and a plate 22, and pivotally mounted to each of said uprights 20 is a downwardly and forwardly extending beam 23, the forward ends of said beams 23 being connected by cross beams 24 and 25. Secured to the under surface of the beams 24 and 25 is a series of forwardly extending rake teeth 26. The said beams 24 and 25 and the teeth 26 form what I shall term a rake or buck.

The beam 24 is supported by cables 27 having their upper ends connected to the apex end of the frame 17, the lower ends of said cables 27 being connected to the beam 24 so that as the upper end of the frame 17 is swung upwardly and rearwardly, the rake will be elevated.

For swinging the upper end of the frame 17 upwardly and rearwardly I have provided the following mechanism:

The axle 13 is provided with the usual draw bar 28 on which I have mounted a bar 29, each end of which is provided with upright bearings 30. Rotatably mounted in the bearings 30 is a shaft 31 having one end provided with a squared portion 32. The central portion of the beam 29 is provided with a gear housing 33 through which the shaft 31 extends. The said shaft 31 is provided with a beveled gear 34 supported within the housing 33, which in turn is in mesh with a pinion 35 mounted on the rear end of a shaft 36. The shaft 36 is connected to a shaft 37 by means of suitable universal coupling devices 38, said shaft 37 being connected to the power take-off shaft 39 of a tractor by means of a universal coupling device 40. Thus means is provided for rotating the shaft 31.

Rotatably mounted on one end of the shaft 31 is a cable drum 41 having at its inner end a brake drum 42 adapted to receive an internal brake band 43 and an external brake band 44. The internal brake band 43 is of the type ordinarily used as an internal brake band of an automobile in which is employed a shaft 45 for setting the band by a rocking movement of said shaft, said shaft 45 being mounted in a bearing 46 carried by a disc 47 fixed to the shaft 31, thus providing means whereby the band and the shaft 45 will rotate in unison with the shaft 31. Fixed to the outer end of the shaft 45 is an arm 48 having a ball and socket joint 49 at its outer end, in which is pivotally connected a link 50, said link 50 being pivotally mounted in a sleeve 51 splined to the shaft 31, so arranged that as the sleeve 51 is moved longitudinally of the shaft 31 the arm 48 will be rocked by said link, causing the band 43 to be engaged or disengaged from the drum 42, thus providing a friction clutch for operatively connecting the shaft 31 with said drum. The sleeve 51 is actuated by means of a yoke 52 fixed to a rock shaft 53, one end of which is carried in a bearing 54 supported by a bar 55 carried on the upper end of the casing 33. The other end of the shaft 53 is rotatably mounted in a bearing 56 carried by the differential housing 57 of the tractor axle, the free end of the shaft 53 being provided with an upturned lever portion 58. This provides means whereby by rocking the upper end of the lever 48 the shaft 53 will be rocked, and with it the arm 52, causing the sleeve 51 to be moved longitudinally of the shaft 31 and the clutch 43 set. The opposite end of the shaft 31 is also provided with a drum 59 similar to the drum 41 and operated by means of an internal clutch mechanism similar to the clutch 43 by means of a lever 60, a link 61, a sleeve 62, a rock arm 63, a rock shaft 64 and a lever 65, thus providing means whereby either of the drums 41 or 59 may be caused to rotate with the shaft 31 independently or simultaneously.

Mounted on the drum 41 is a cable 66 passing through a pulley 67 carried by the upper end of one of the members 20 and thence through a pulley 68 carried by the apex end of the frame 18 and thence to an anchor plate 69 carried by one end of the frame member 29. By this arrangement it will be seen that as the drum 41 is rotated the corresponding end of the cable 66 will be wound thereon, causing the upper end of the frame 18 to be elevated, and with it the rake 26.

For locking the rake in its elevated position I have provided the external brake band 44, one end of said brake band being fixed to a bracket 70 carried by the bar 29, with the other end of said band extending through said pivoted end and connected to a link 71 carried by the lever 72, said lever 72 being pivotally connected to one end of the bracket member 56 by means of a pivot 73. The lower end of the lever 72 is provided with a spring 74, one end of which is connected to the link 71 in such a manner that tension being applied to the spring 74 will cause the band 44 to be maintained taut and to hold the drum 41 against rotation in a clockwise direction, as viewed in Figures 1 and 5, and against rotation to lower the rake 26. If it is desired to lower the rake the operator simply moves the upper end of the lever 72 in a clockwise direction causing the rod 71 to be moved downwardly against the tension of the spring 74 and the band 44 released from the drum. The rake will then be lowered by gravity.

The above arrangement provides means whereby the rake and the arms 23 may be elevated to an upwardly and forwardly inclined position, with the load resting on the tines 26 and against a rack 75 which is slidably mounted longitudinally of the tines 26, said rack including a bar 75a supported beneath said tine 26.

In order to discharge the load from the tines the rack 75 is moved forwardly toward the free end of the tines 26. To accomplish this movement of the rack 75 I have provided rearwardly extending arms 76 having their forward ends fixed to the rack by means of bolts 77 and braces 78. The rear ends of the arms 76 are provided with brackets 79 slidably mounted on shafts 80 carried in suitable brackets 81 and 82 fixed to the outer surface of the bars 23.

Fixed to one of the brackets 79 is a cable 83 mounted to pass over a pulley 84 carried in the forward end of the arm 23, thence over a pulley 85 carried over the forward end of the other arm 23, thence to the drum 59. The bracket 79 on the opposite side of the tractor is provided with a cable 86 passing over a pulley 87 above the bar 85, and on the same pivot, having its other end connected to the cable 83 by means of a splice 88.

By this arrangement it will be seen that if the drum 59 is rotated by actuating the control lever 65, the bracket 79 will be moved forwardly of the guide rods 80, and in turn move the arms 76 forwardly, causing the frame 75 to be moved forwardly of the teeth 26, and the load carried thereon to be discharged from the free ends of said tines. By releasing the clutch 43 of the drum 59 the rack 75 will then be permitted to return to the back end of the rake by gravity, while the rake is still in its elevated position, or if the load is released from the tines 26 while in a less inclined position wherein gravity fails to return the rack to its rearward position of movement, the rack will be automatically returned at the time the tines are filled, and so utilized as a buck, by the pressure of the hay as it is being gathered on the tines.

Thus, it will be seen I have provided a very simple and inexpensive hay buck and loader which may be easily and quickly attached to a tractor frame simply by attaching the bar 15 and the brackets 21 and applying the bar 29 to the standard drawbar of the tractor, and operatively connecting the shaft 37 to the power take-off shaft 39 of the tractor; and when so attached I have provided means whereby hay or any similar crop may be gathered by lowering the free ends of the tines 26 to the ground surface and advancing the tractor forwardly so that the tines pass beneath the material to be gathered, causing it to be crowded on to the tines and in front of the rack 75. The lever 58 may then be operated, causing the tines 26 to be elevated a distance to lift the load clear of the ground surface, after which it may be carried to the stack or to a wagon rack, after which further upward movement of the tines may be accomplished to the top of the stack or top of the wagon rack, after which the lever 65 may be actuated, causing the load carried by the tines to be delivered either to the stack or the wagon rack. This load may be advanced slowly if so desired so that it may be easily handled by the person on the stack or the wagon rack, or the load may be discharged rapidly at the will of the operator.

By mounting the stacker on the tractor the weight of the tractor tends to provide sufficient stability for the stacker when in an elevated position. The tractor also provides the necessary mobile truck, and at the same time power for operating the stacker.

The bar 75a provides means whereby the tines 26 may be held in a common plane to stiffen any tine or group of tines that may be carrying an excessive load at or near their outer ends at the time when the rack 75 is near its discharge end.

I claim as my invention:
1. In a combined hay buck and stacker, the combination of a pivot-supporting bracket adapted to be attached to each end of a tractor axle housing, a rake having rearwardly-extending and spaced-apart beams, means pivoting the rear end of each of said beams to a corresponding one of said pivot brackets, a guide supported longitudinally on one side of each of said beams, an upright frame supported on the tines of said rake, mounted to move longitudinally thereof and having rearwardly-extending arms, means slidably connecting the rear ends of said arms on said guides, a cross bar adapted to be carried by the under side of a tractor frame, an upwardly and forwardly inclined gin frame adapted to straddle the forward end of a tractor having its ends pivoted to the corresponding ends of said cross bar, depending means connecting the apex end of said gin frame to the back end of said rake, adapted to elevate said rake as the top end of said gin is moved upwardly and rearwardly, a cable drum, a cable carried by said drum having one end connected to the apex end of said gin for imparting said swinging movement thereto, and means actuated by power derived from a tractor for actuating said cable drum.

2. In a combined hay buck and stacker, the combination of a pivot-supporting bracket adapted to be attached to each end of a tractor axle housing, a rake having rearwardly-extending and spaced-apart beams, means pivoting the rear end of each of said beams to a corresponding one of said pivot brackets, a guide supported longitudinally on one side of each of said beams, an upright frame supported on the tines of said rake, mounted to move longitudinally thereof and having rearwardly-extending arms, means slidably connecting the rear ends of said arms on said guides, a cross bar adapted to be carried by the under side of a tractor frame, an upwardly and forwardly inclined gin frame adapted to straddle the forward end of a tractor having its ends pivoted to the corresponding ends of said cross bar, depending means connecting the apex end of said gin frame to the back end of said rake, adapted to elevate said rake as the top end of said gin is moved upwardly and rearwardly, an auxiliary frame adapted to be carried by and rearwardly of a tractor axle, a drum-actuating shaft carried by said auxiliary frame, a cable drum carried by each end of said shaft, means for rotating said shaft, means for independently and operatively connecting each of said drums with said shaft, means for locking one of said drums against rotation in one direction, means for releasing said locking means, a cable carried by said drum having its free end connected to the apex end of said gin frame to raise and lower said rake, a pulley carried by the inner end of each of said beams, a second pulley carried above one of said first pulleys, a cable carried by the other one of said drums, a third cable having one end spliced in the last said cable to form a Y, one portion of said Y being extended over two of said pulleys and connected to the free end of one of the rearwardly-extending arms, the other Y portion of said cable being mounted around the third one of said pulleys and connected to the rear end of another one of said rearwardly-extending arms.

3. In a combined hay buck and stacker, a hay rake having rearwardly extending and spaced apart beams, means pivoting the rear end of each of said beams to a tractor near its rear end, an upright frame supported on the tines of said rake, mounted to move longitudinally thereof and having rearwardly extending arms, means supporting said arms to move longitudinally of said beams, a cross bar adapted to be carried by said tractor frame near its forward end, an upwardly and forwardly inclined gin frame adapted to straddle the forward end of a tractor having its ends pivoted to the corresponding ends of said cross bar, depending means connecting the apex end of said gin frame to the back end of said rake, adapted to elevate said rake as the top of said gin is moved upwardly and rearwardly, a pair of cable drums, a cable carried by one of said drums having one end connected to the apex end of said gin for imparting swinging movement thereto, a cable carried by the other drum having one end operatively connected to the movably mounted end of the rearwardly extending arms, and means actuated by power derived from a tractor for actuating said cable drums.

4. The combination of a rake having rearwardly extending and spaced apart beams, means pivotally connecting the rear end of each of said beams to opposite sides of a tractor near its rear end, a guide supported longitudinally of one side of each of said beams, an upright frame supported on the tines of said rake, mounted to move longitudinally thereof and having rearwardly extending arms, means slidably connecting the rear ends of said arms on corresponding ones of said guides, an upwardly and forwardly inclined gin adapted to straddle the forward end of a tractor, means pivotally attaching the lower ends of said gin to a tractor frame at a point near its forward end, depending means connecting the apex end of said gin to the back end of said rake, adapted to elevate the rake as the top end of the gin is moved upwardly and rearwardly, an auxiliary frame adapted to be carried by and rearwardly of a tractor axle, a drum-actuating shaft carried by said auxiliary frame, a cable drum carried by each end of said shaft, means for rotating said shaft, means for independently and operatively connecting each of said drums with said shaft, means for locking one of said drums against rotation in one direction, means for releasing said locking means, a cable carried by said drum having its free end connected to the apex end of said gin to raise and lower said rake, a cable having one end carried by the other one of said drums, means operatively connecting the other end of said cable to the slidably mounted ends of said arms whereby the upright frame will be supported transversely of its line of movement during the time it is moved outwardly.

5. The combination of a rake having rearwardly extending and spaced apart beams, means pivotally connecting the rear end of each of said beams to opposite sides of a tractor near its rear end, a guide supported longitudinally of one side of each of said beams, an upright frame supported on the tines of said rake, mounted to move longitudinally thereof and having rearwardly extending arms, means slidably connecting the rear ends of said arms on corresponding ones of said guides, means carried by said tractor for elevating and lowering the forward end of said beams and rake carried thereby, and means actuated by power derived from said tractor and applied to the inner ends of said arms for moving said upright frame forwardly, said arms being actuated at the same rate of speed to maintain the upright frame in position transversely of its line of movement.

6. A combined hay buck and stacker, comprising a rake having rearwardly extending and spaced apart beams adapted to straddle the front end of a tractor, means pivoting the rear ends of said beams to a tractor frame near its rear end, an upright frame supported on the tines of said rake, mounted to move longitudinally thereof and having rearwardly extending arms, means mounting each of said arms to slide longitudinally of a corresponding beam, means carried by the front end of said tractor for elevating said rake from a downwardly and forwardly inclined position to an upwardly and forwardly inclined position, means actuated by power derived from the tractor for actuating said rake elevating means, and means actuated by power derived from said tractor and applied evenly and simultaneously to the inner ends of said arms for moving said upright frame toward the outer ends of said tines while the rake is in its upwardly and forwardly inclined position, whereby the upright frame will be held in position transversely of its line of movement.

7. The combination of a rake having rearwardly extending and spaced apart beams, means pivotally connecting the rear end of each of said beams to opposite sides of a tractor near its rear end, an upright frame supported on the tines of said rake mounted to move longitudinally thereof and having rearwardly extending arms, means for guiding said arms to move longitudinally of said beams, means carried by said tractor for elevating and lowering the forward ends of said beams and rake carried thereby, means actuated by power derived from said tractor and applied to the inner end of said arms for moving said upright frame forwardly, said arms being actuated at the same rate of speed to maintain the upright frame in position transversely of its line of movement.

8. The combination of a rake having rearwardly extending and spaced apart beams, means pivotally connecting the rear end of each of said beams to opposite sides of a tractor near its rear end, an upright frame supported on the tines of said rake mounted to move longitudinally thereof and having rearwardly extending arms, means guiding said arms to move longitudinally of said beams, an upwardly and forwardly inclined gin adapted to straddle the forward end of a tractor, means pivotally attaching the lower ends of said gin to a tractor frame at a point near its forward end, depending means connecting the apex end of said gin to the back end of said rake, adapted to elevate the rake as the top end of the gin is moved upwardly and rearwardly, an auxiliary frame adapted to be carried by and rearwardly of a tractor axle, a drum-actuating shaft carried by said auxiliary frame, a cable drum carried by each end of said shaft, means for rotating said shaft, means for independently and operatively connecting each of said drums with said shaft, means for locking one of said drums against rotation in one direction, means for releasing said locking means, a cable carried by said drum having its free end connected to the apex end of said gin to raise and lower said rake, a cable having one end carried by the other one of said drums, means operatively connecting the other end of said cable to the movably mounted ends of said arms whereby the upright frame will be supported transversely of its line of movement during the time it is moved outwardly.

PETER H. O. WEBER.